(12) United States Patent
Mossberg et al.

(10) Patent No.: US 7,720,334 B1
(45) Date of Patent: May 18, 2010

(54) LATERALLY-CONFINED HOLOGRAPHIC SPECTRAL FILTERS

(76) Inventors: Thomas W. Mossberg, LightSmyth Technologies Inc, 1720 Willow Creek Cir., Suite 520, Eugene, OR (US) 97402; Christoph M. Greiner, LightSmyth Technologies Inc, 1720 Willow Creek Cir., Suite 520, Eugene, OR (US) 97402; Dmitri Iazikov, LightSmyth Technologies Inc, 1720 Willow Creek Cir., Suite 520, Eugene, OR (US) 97402

( * ) Notice: Subject to any disclaimer, the term of this patent is extended or adjusted under 35 U.S.C. 154(b) by 0 days.

(21) Appl. No.: 11/774,567

(22) Filed: Jul. 7, 2007

Related U.S. Application Data

(60) Provisional application No. 60/819,116, filed on Jul. 7, 2006.

(51) Int. Cl.
*G02B 6/10* (2006.01)
*G02B 6/34* (2006.01)

(52) U.S. Cl. .................. 385/37; 385/129; 385/130; 385/131; 385/132

(58) Field of Classification Search .................. 385/37, 385/129–132
See application file for complete search history.

(56) References Cited

U.S. PATENT DOCUMENTS

| | | | |
|---|---|---|---|
| 6,678,429 B2 | 1/2004 | Mossberg et al. | |
| 6,768,842 B2 * | 7/2004 | Bulthuis et al. | ............... 385/37 |
| 6,823,115 B2 | 11/2004 | Greiner et al. | |
| 6,829,417 B2 | 12/2004 | Greiner et al. | |
| 6,859,318 B1 | 2/2005 | Mossberg et al. | |
| 6,879,441 B1 | 4/2005 | Mossberg | |
| 6,961,491 B2 | 11/2005 | Greiner et al. | |
| 6,965,464 B2 | 11/2005 | Mossberg | |
| 6,965,716 B2 | 11/2005 | Greiner et al. | |
| 6,985,656 B2 | 1/2006 | Iazikov et al. | |
| 6,987,911 B2 | 1/2006 | Mossberg et al. | |
| 6,990,276 B2 | 1/2006 | Brice et al. | |
| 6,993,223 B2 | 1/2006 | Greiner et al. | |
| 7,009,743 B2 | 3/2006 | Mossberg | |
| 7,054,517 B2 | 5/2006 | Mossberg et al. | |
| 7,062,128 B2 | 6/2006 | Mossberg | |
| 7,116,453 B2 | 10/2006 | Mossberg | |

(Continued)

OTHER PUBLICATIONS

Mossberg, Planar holographic optical processing devices, Opt. Lett., vol. 26 No. 27 pp. 414-416 (Apr. 1, 2001).

*Primary Examiner*—Frank G Font
*Assistant Examiner*—Jerry Blevins
(74) *Attorney, Agent, or Firm*—Schwabe, Williamson & Wyatt, P.C.

(57) ABSTRACT

An optical apparatus comprises a first and second cladding layers and first and second core layers between the cladding layers. The second core has a set of diffractive elements. The first core and the claddings are arranged to form a slab waveguide supporting slab waveguide modes and confining in one transverse dimension optical signals propagating in two dimensions in the slab waveguide modes. The second core and the claddings are arranged to from a channel waveguide supporting one or more channel waveguide optical modes and confining in two transverse dimensions optical signals propagating in one dimension in the channel waveguide modes. The diffractive elements are arranged to couple at least one slab waveguide mode and at least one channel waveguide mode to enable transfer of an optical signal between the slab and channel waveguide optical modes thus coupled.

20 Claims, 15 Drawing Sheets

U.S. PATENT DOCUMENTS

| | | |
|---|---|---|
| 7,120,334 B1 | 10/2006 | Greiner et al. |
| 7,123,794 B2 | 10/2006 | Greiner et al. |
| 7,190,589 B2 | 3/2007 | Caines et al. |
| 7,190,856 B1 | 3/2007 | Iazikov et al. |
| 7,190,858 B1 | 3/2007 | Greiner et al. |
| 7,194,164 B2 | 3/2007 | Iazikov et al. |
| 7,203,401 B2 | 4/2007 | Mossberg et al. |
| 7,224,855 B2 | 5/2007 | Iazikov et al. |
| 7,224,867 B2 | 5/2007 | Mossberg |
| 7,260,290 B1 | 8/2007 | Greiner et al. |
| 7,286,732 B2 | 10/2007 | Greiner et al. |
| 7,292,755 B1 | 11/2007 | Greiner et al. |
| 7,327,908 B1 | 2/2008 | Iazikov et al. |
| 7,330,614 B1 | 2/2008 | Mossberg et al. |
| 7,333,692 B1 | 2/2008 | Mossberg et al. |
| 7,349,599 B1 | 3/2008 | Iazikov et al. |
| 7,359,597 B1 | 4/2008 | Iazikov et al. |
| 7,181,193 B2 | 2/2009 | Greiner et al. |
| 2004/0179779 A1* | 9/2004 | Greiner et al. ............ 385/37 |
| 2006/0177178 A1 | 8/2006 | Greiner et al. |
| 2007/0034730 A1 | 2/2007 | Mossberg |
| 2007/0053635 A1 | 3/2007 | Iazikov et al. |

* cited by examiner

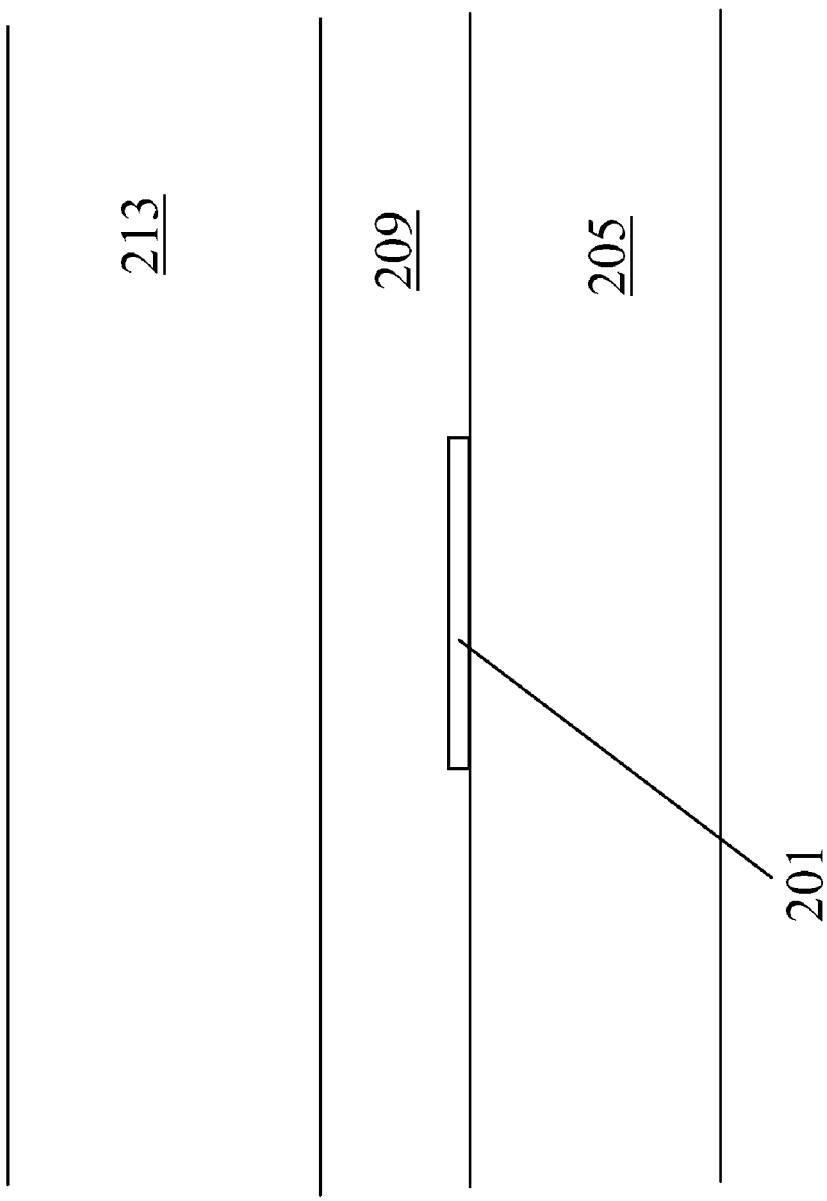

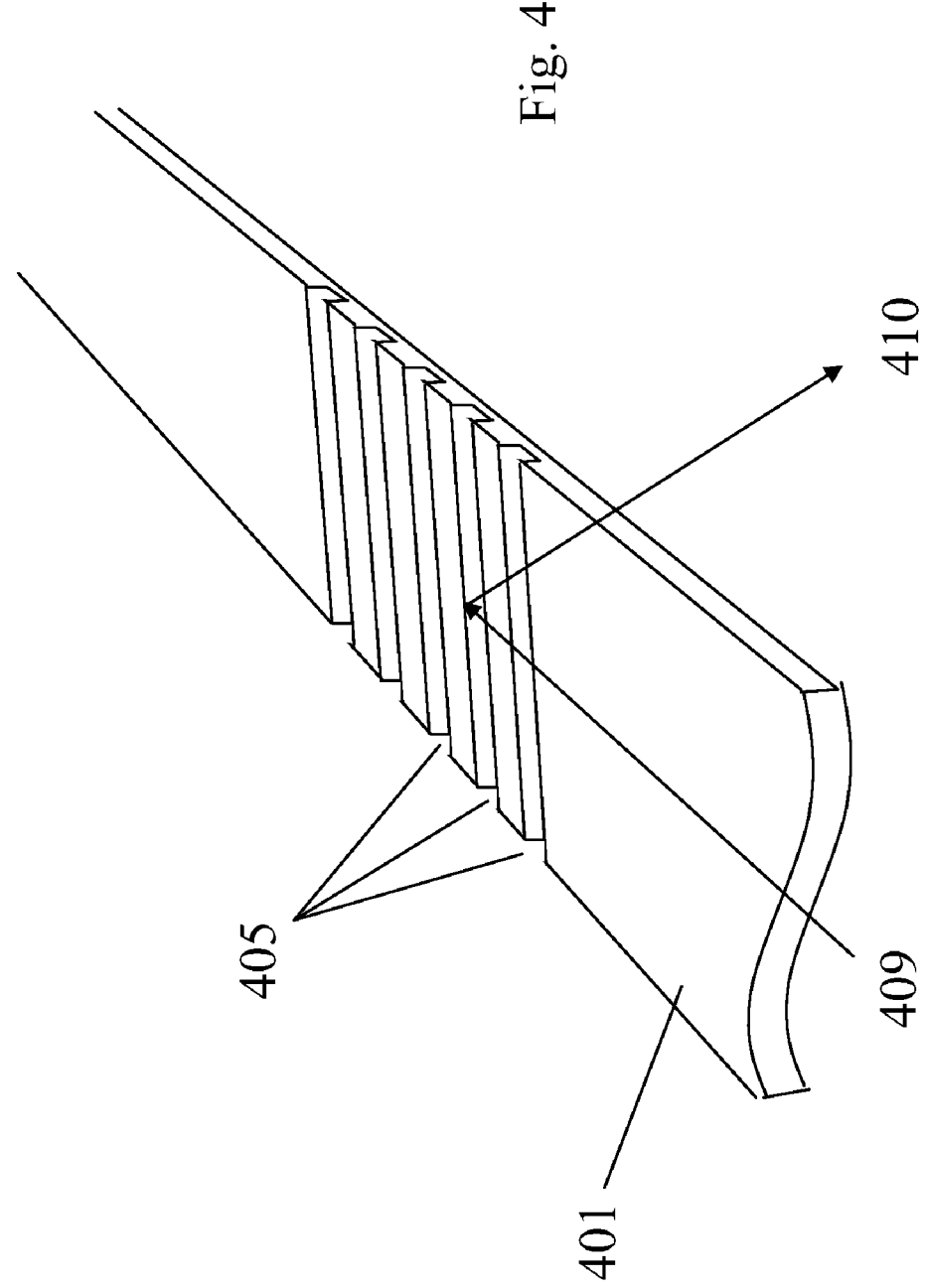

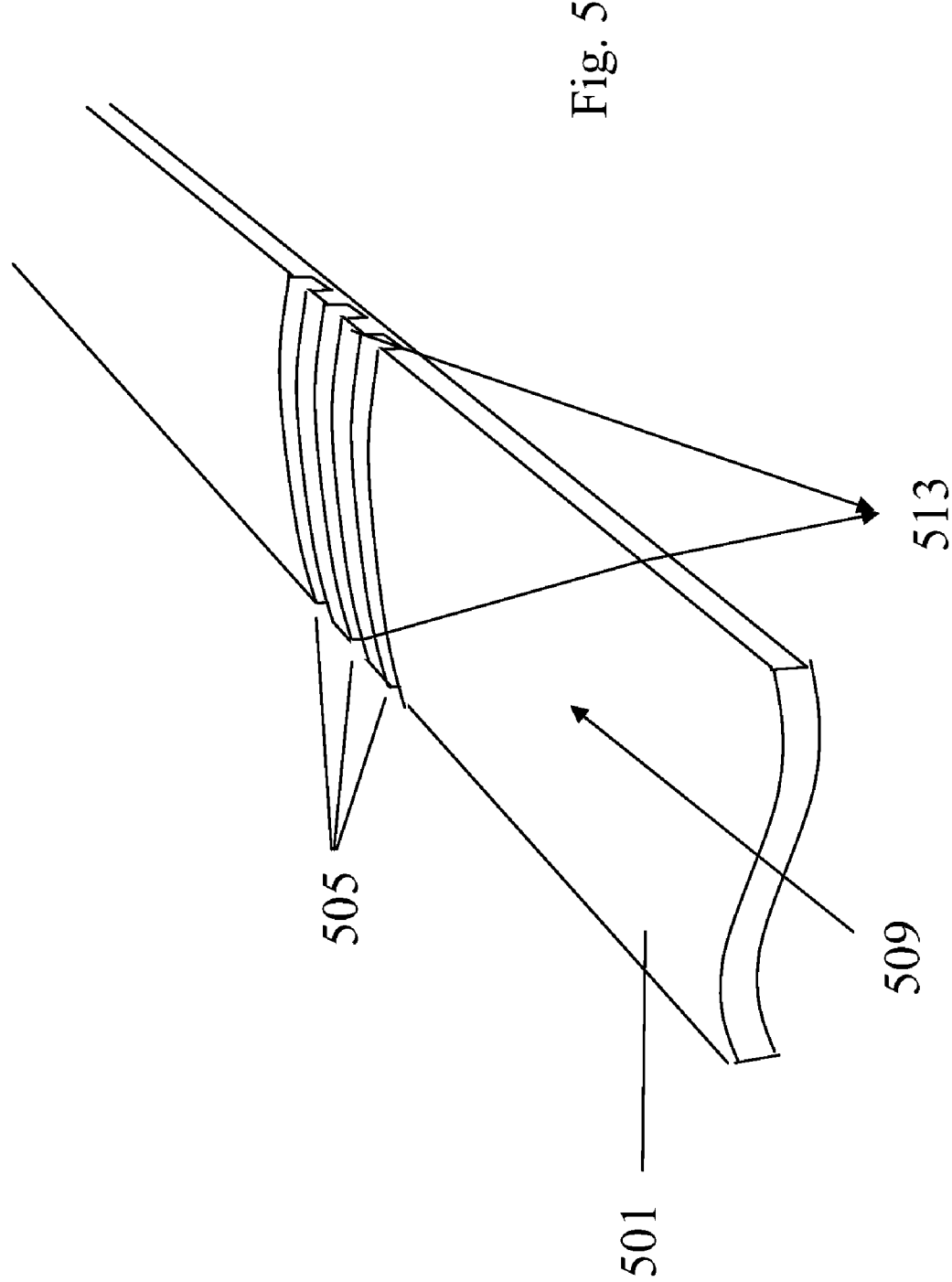

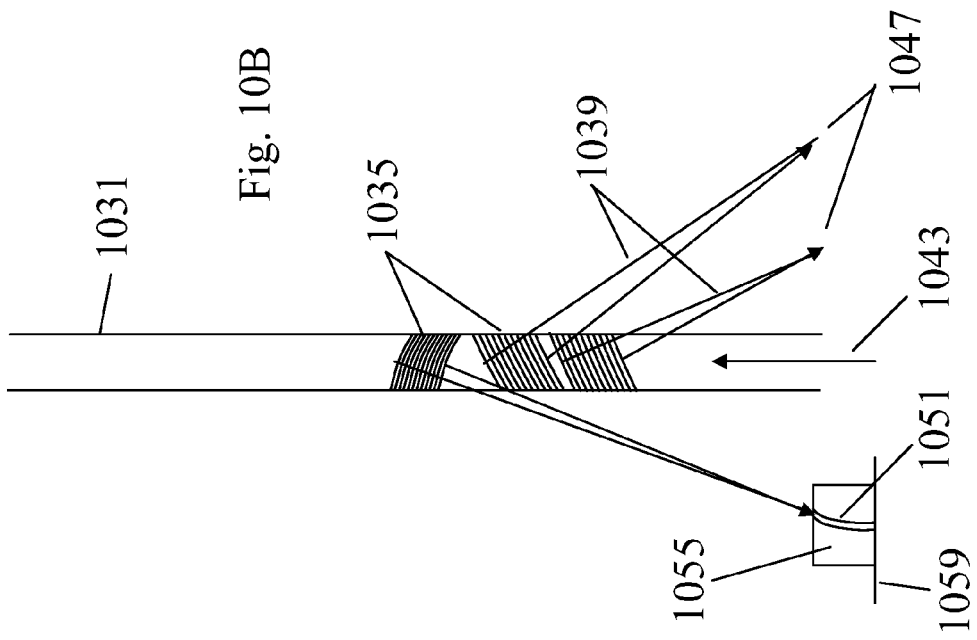
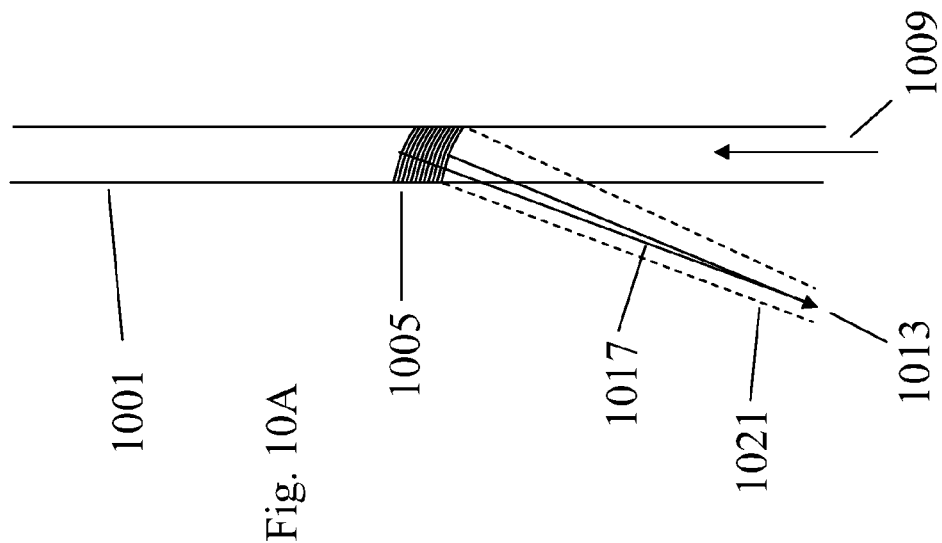

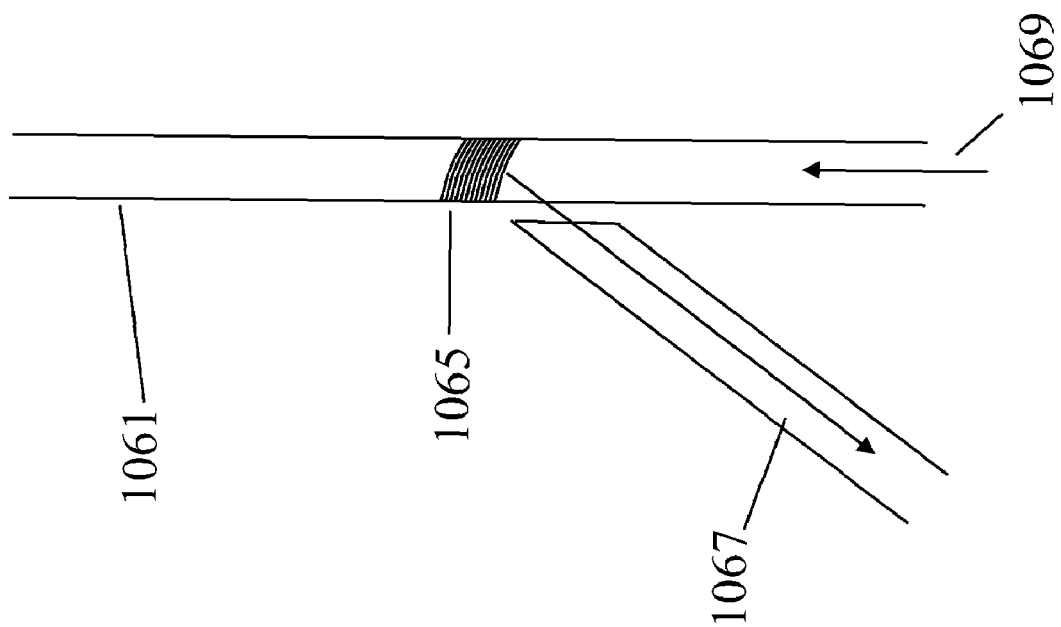

LATERALLY-CONFINED HOLOGRAPHIC SPECTRAL FILTERS

BENEFIT CLAIMS TO RELATED APPLICATIONS

This application claims the benefit of U.S. provisional App. No. 60/819,116 filed Jul. 7, 2006, said provisional application being hereby incorporated by reference as if fully set forth herein.

BACKGROUND

The field of the present invention relates to diffractive optical structures. In particular, diffractive optical structures coupling optical signals between slab waveguide optical modes and channel waveguide optical modes are disclosed herein.

Various embodiments, implementations, and adaptations of diffractive element sets are disclosed in:

application Ser. No. 11/685,212 filed Mar. 13, 2007 (now U.S. Pat. No. 7,286,732);
application Ser. No. 11/676,273 filed Feb. 17, 2007;
application Ser. No. 11/552,501 filed Oct. 24, 2006 (now U.S. Pat. No. 7,333,692);
application Ser. No. 11/548,279 filed Oct. 10, 2006 (now U.S. Pat. No. 7,292,755);
application Ser. No. 11/532,532 filed Sep. 17, 2006 (now U.S. Pat. No. 7,190,859);
application Ser. No. 11/531,274 filed Sep. 12, 2006;
application Ser. No. 11/423,856 filed Jun. 13, 2006 (now U.S. Pat. No. 7,224,867);
application Ser. No. 11/383,494 filed May 16, 2006 (now U.S. Pat. No. 7,203,401);
application Ser. No. 11/277,491 filed Mar. 25, 2006 (now U.S. Pat. No. 7,190,856);
application Ser. No. 11/277,423 filed Mar. 24, 2006;
application Ser. No. 11/376,714 filed Mar. 14, 2006 (now U.S. Pat. No. 7,349,599);
application Ser. No. 11/371,339 filed Mar. 7, 2006 (now U.S. Pat. No. 7,327,908);
application Ser. No. 11/361,407 filed Feb. 23, 2006 (now U.S. Pat. No. 7,116,453);
application Ser. No. 11/334,039 filed Jan. 17, 2006;
application Ser. No. 11/298,290 filed Dec. 9, 2005 (now U.S. Pat. No. 7,330,614);
application Ser. No. 11/280,876 filed Nov. 15, 2005;
application Ser. No. 11/239,540 filed Sep. 28, 2005 (now U.S. Pat. No. 7,009,743);
application Ser. No. 11/213,345 filed Aug. 25, 2005 (now U.S. Pat. No. 7,120,334);
application Ser. No. 11/210,439 filed Aug. 23, 2005 (now U.S. Pat. No. 7,359,597);
application Ser. No. 11/155,327 filed Jun. 16, 2005 (now U.S. Pat. No. 7,190,858);
application Ser. No. 11/076,251 filed Mar. 8, 2005 (now U.S. Pat. No. 7,062,128);
application Ser. No. 11/062,109 filed Feb. 17, 2005 (now U.S. Pat. No. 7,181,103);
application Ser. No. 11/055,559 filed Feb. 9, 2005 (now U.S. Pat. No. 7,123,794);
application Ser. No. 11/021,549 filed Dec. 23, 2004 (now U.S. Pat. No. 7,260,290);
application Ser. No. 10/998,185 filed Nov. 26, 2004 (now U.S. Pat. No. 6,993,223);
application Ser. No. 10/989,244 filed Nov. 15, 2004 (now U.S. Pat. No. 6,961,491);
application Ser. No. 10/989,236 filed Nov. 15, 2004 (now U.S. Pat. No. 6,965,716);
application Ser. No. 10/923,455 filed Aug. 21, 2004 (now U.S. Pat. No. 7,054,517);
application Ser. No. 10/898,527 filed Jul. 22, 2004 (now U.S. Pat. No. 7,194,164);
application Ser. No. 10/857,987 filed May 29, 2004 (now U.S. Pat. No. 6,990,276);
application Ser. No. 10/842,790 filed May 11, 2004 (now U.S. Pat. No. 6,987,911);
application Ser. No. 10/798,089 filed Mar. 10, 2004 (now U.S. Pat. No. 6,823,115);
application Ser. No. 10/794,634 filed Mar. 5, 2004 (now U.S. Pat. No. 6,985,656);
application Ser. No. 10/740,194 filed Dec. 17, 2003 (now U.S. Pat. No. 7,224,855);
application Ser. No. 10/653,876 filed Sep. 2, 2003 (now U.S. Pat. No. 6,829,417);
application Ser. No. 10/602,327 filed Jun. 23, 2003 (now U.S. Pat. No. 6,859,318);
application Ser. No. 10/229,444 filed Aug. 27, 2002 (now U.S. Pat. No. 6,678,429);
application Ser. No. 09/843,597 filed Apr. 26, 2001 (now U.S. Pat. No. 6,965,464); and
application Ser. No. 09/811,081 filed Mar. 16, 2001 (now U.S. Pat. No. 6,879,441).

Each of said applications and patents is hereby incorporated by reference as if fully set forth herein. A publication entitled "Planar holographic optical processing devices" (T. W. Mossberg, Opt. Lett. 26 414 (2001)) is also incorporated by reference as if fully set forth herein.

SUMMARY

An optical apparatus comprises a first cladding layer, a second cladding layer, a first core layer, and a second core layer. The first and second cores layers are each between the first and second cladding layers. The second core layer has a set of diffractive elements. The first and second cladding layers and the first core layer are arranged so as to form a slab waveguide that supports a plurality of slab waveguide optical modes and that substantially confines in one transverse dimension optical signals propagating in two dimensions in the slab waveguide optical modes. The first and second cladding layers and the second core layer are arranged so as to from a channel waveguide that supports one or more channel waveguide optical modes and that substantially confines in two transverse dimensions optical signals propagating in one dimension in the channel waveguide optical modes. The diffractive elements are arranged so as to couple at least one of the slab waveguide optical modes and at least one of the channel waveguide optical modes so as to enable transfer of an optical signal between the slab and channel waveguide optical modes thus coupled.

Objects and advantages of the present invention may become apparent upon referring to the exemplary embodiments illustrated in the drawings and disclosed in the following written description and/or claims.

BRIEF DESCRIPTION OF THE DRAWINGS

FIG. 2 illustrates schematically a cross-sectional view of an exemplary optical waveguide supporting both slab and channel waveguide optical modes.

FIG. 4 illustrates schematically diffractive elements in an exemplary channel waveguide core.

FIG. 5 illustrates schematically diffractive elements in an exemplary channel waveguide core.

FIGS. 10A-10C illustrate schematically several exemplary diffractive element sets curved for focusing diffracted optical signals.

Figure 1:
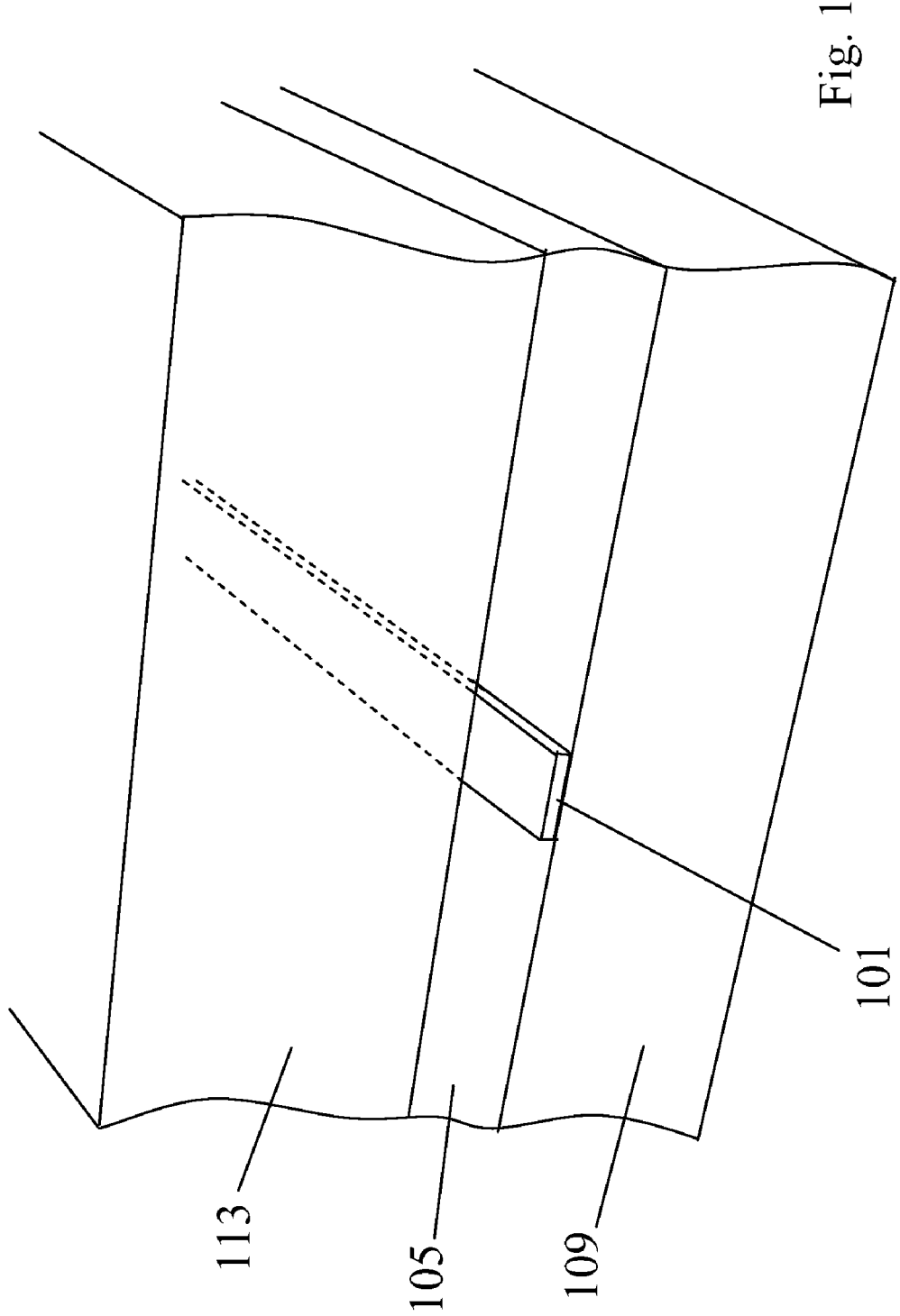
FIG. 1 illustrates schematically a cut-away view of an exemplary optical waveguide supporting both slab and channel waveguide optical modes.
Figure 3A:
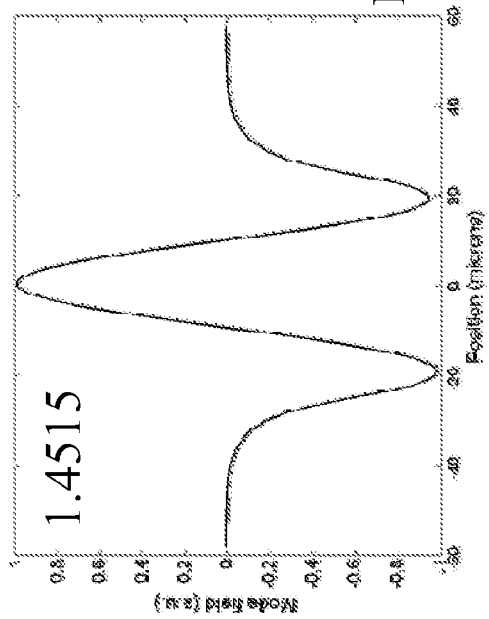
FIG. 3 illustrates schematically optical mode field profiles for several channel waveguide optical modes.
Figure 3B:
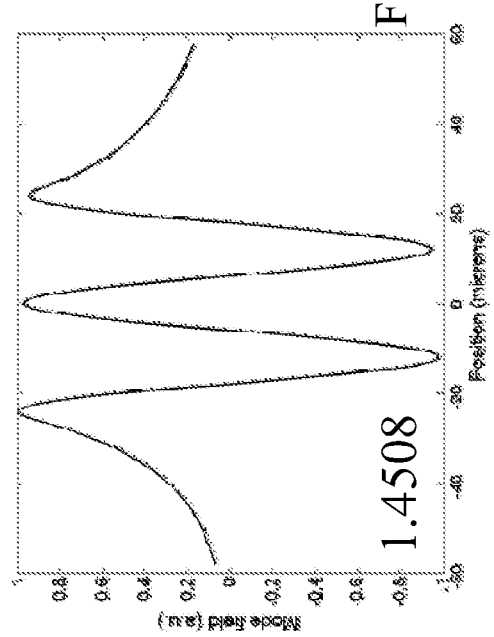
Figure 3C:
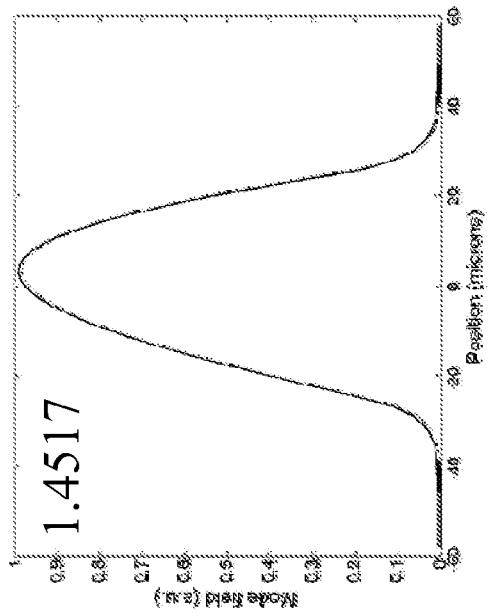
Figure 3D:
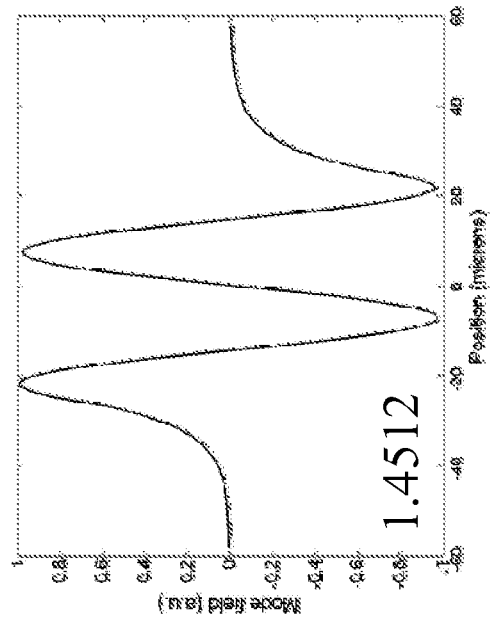

The embodiments shown in the Figures are exemplary, and should not be construed as limiting the scope of the present disclosure and/or appended claims.

DETAILED DESCRIPTION OF EMBODIMENTS

In a slab waveguide environment, optical signals are free to propagate in two spatial dimensions while confined in one spatial dimension. Signals propagating within the slab may occupy a near continuum of spatial modes spanning the two propagation directions. Signal wavefronts analogous to those of free space are supported. Local inhomogeneities in refractive index or waveguide morphology that may arise in an uncontrolled fashion during manufacture may have the effect of coupling various signal propagation modes. As a result, signals intended to follow a particular path through a slab waveguide device and exit via a fixed port may be deflected or defocused so as to completely or partially miss the intended exit port thereby impairing to various degrees design device function. The sensitivity of slab waveguide modes to distortion is undesirable. The slab environment differs from the channel waveguide environment as the latter often has only a single mode with fixed spatial properties or a set of discrete modes with quite different spatial properties. In channel waveguides, local variations in refractive index or waveguide morphology are typically less effective in coupling the quite different modes and are thus less degrading to mode-specific device function.

An integrated holographic structure is comprised of diffractive elements, each of which is conceptually related to fringes in a real or computed interference pattern between design input and output beams. In highly reflective devices, diffractive elements may differ from those in interference patterns as their function must account for multiple scattering. Methods are known in the art applicable to fiber Bragg gratings can be applied to calculate patterns of diffractive elements in the limit of high reflectivity. Diffractive elements (or contours) are analogous to lines in a standard surface reflective grating in the sense that such lines correspond to interference fringes that would be produced by the input and output plane wave beams to a standard surface grating—should such beams be computationally or physically interfered. In integrated holographic spectral filtering devices, diffractive elements are functional individually for in-plane signals and collectively for out-of-plane signals to create from an design input signal having a specific design input wavefront a design output signal having a specific design output wavefront. An integrated holographic structure in a slab waveguide can both spectrally filter signals and transform them from one propagational mode (wavefront) to another. Integrated holographic structures may also be called directional photonic bandgap materials or photonic crystals, photonic quasi-crystals or other terms known in the art. Of particular interest in relation to the present invention are integrated holographic structures whose diffractive elements are sufficiently long that light diffracted from them emerges with a relatively well-defined wavefront reflective of the diffractive element geometry.

It is of value to identify devices wherein integrated holographics may be deployed to provide both spectral and spatial signal processing and control while at the same time providing signals a high degree of immunity to uncontrolled variations in local refractive index or waveguide morphology. The present invention provides such devices.

In order to achieve strong coupling between propagating signals and diffractive elements, it is often desirable to utilize a guiding layer comprised of two or more sublayers with one sublayer, the grating layer, having a relatively high refractive index contrast relative to the cladding layers. The other guiding sublayer, the core layer, typically has an index between that of the grating layer and the cladding layers. In silica-based planar waveguide devices, the grating layer index may be three percent above that of the cladding layers while the core layer may be 0.7-0.8 percent above the cladding layers. The diffractive elements may be etched into the grating sublayer and filled with material from cladding or core sublayers. Other values of refractive index contrast may be employed as well. Other material formats such as silicon-based waveguiding arrangements will typically involve both higher absolute indices and higher index contrasts. As will become apparent below, indices may be chosen so as to provide a grating stripe that supports directional guided waves (along the length of the stripe) within the environment of a slab waveguide, which supports a range of guided signal modes confined in only one-dimension. It should be noted that the device function just describe may be achieved with guiding structures having multiple layers not explicitly described here. Such layers may be employed to optimize various device properties without interfering with the stripe guide and slab guide combination. The presence or absence of additional layers does not materially limit the scope of the present invention.

In devices constructed according to the current art, integrated holographic structures span an area large compared to signal modes and appear essentially homogeneous in the direction lateral to the signal propagation direction. As such, signals may couple to a near continuum of modes with concomitant sensitivity to deflection and defocus in the presence of uncontrolled manufacturing variations in refractive index and guide morphology.

In devices constructed according to the teachings of the present invention, the grating layer is formed over a limited spatial extent thereby changing the character of available signal modes in certain directions to discreet rather than continuous. The introduction of mode discretization acts to reduce the effectiveness of manufacturing imperfections in coupling signal fields out of their design modes. The grating layer is, however, still applied over an area large enough so that diffractive elements within it may provide, even on a single-element basis, some control over the wavefront of signals diffracted from it.

FIG. 1 shows a cut away view of a slab waveguide with core guiding layer (105) and grating guiding sublayer stripe (101) according to the present invention. The guiding layers are surrounded by lower (109) and upper (113) claddings typically of lower refractive index than the guiding layers (however, leaky modes may be supported over shorter distances by claddings of various indices including those higher in index than the guiding layers). Diffractive elements comprising integrated holographic structures, e.g. holographic spectral filters, are typically etched in the spatially localized grating layer (101) and signal modes typically span the transverse extent of the grating layer and may extend some distance beyond. The grating layer, being of a relatively higher refractive index, establishes signal modes that propagate along its extended direction but are localized (bound) transversely. The bound mode spectrum is discrete. A near continuum of modes still exists for signal modes propagating at angles relative to the sides of the grating layer stripe. Integrated holographic structures and their constituent diffractive elements act to diffract bound grating layer signals into continuum bound core layer signals or potentially oppositely directed or different modes bound within the grating stripe.

In FIG. 2, a cross-section of device according to the present invention is shown. Layer 201 is the grating layer stripe, 209 is the core layer, and layers 205 and 213 are cladding layers. In the silica-on-silicon format, the grating and core layer materials may, respectively, be 3 and 0.7 percent higher index than the cladding material. The grating layer may be 50 microns wide and 300 nm thick. The diffractive elements may be etched or otherwise formed (stamping, embossing, etc.) across the entire grating layer stripe, part of it, or all of it and beyond into the core layer region. The grating layer stripe with or without diffractive elements comprises a guiding structure supporting at least one mode. The core layer may be 2-4 microns thick while cladding layers may be 15 microns thick. Wide variation of dimensions and indices around these exemplary values is possible and each material format will have its optimal parameter set. In implementing variations, it is preferred to provide for stable signal modes that propagate along the grating layer stripe, a continuum of core-layer-confined signal modes propagating at angles relative to the axis of the grating layer stripe, and a width of the grating stripe large enough to allow diffractive elements spanning the width of the grating layer stripe to localize output signal beams angularly according to needs of a specific design as discussed below.

FIGS. 3A-3D show the transverse mode profiles of four of the lower-order signal modes bound to propagate along a grating layer stripe with the properties described in the preceding paragraph. Large inset numbers are effective modal refractive indices. Note that there is a significant difference in effective refractive index between these modes. The difference in modal index gives some guidance as to the magnitude of local index variations, presumably arising from uncontrolled manufacturing processes but also by other means, that can be tolerated without serious coupling between grating-stripe-confined signal modes. Provided that index variations occur slowly with position, larger index variations can be tolerated.

In FIG. 4, a close up view of a grating layer stripe (401) is shown with diffractive elements (405) etched into its top. An input signal (409) propagating as a bound mode along the grating stripe diffracts from diffractive elements (405). Signal diffracting from a single diffractive element emerges with an angular cone set by usual diffractive spreading determined by the lateral width of the diffractive element. Signals diffracted by more than a certain angle by the diffractive element are no longer bound by the grating layer stripe. The minimum angle which diffractive elements must diffract a signal so that it will transmitted through the grating stripe boundary and enter the near continuum of core-layer-bound modes (e.g., output signal 410) is set by total internal reflection considerations at the grating layer boundary. It should be noted that with standard deposition processes, the core layer will be of approximately constant thickness across the wafer and therefore will bulge up a bit in regions where the grating layer has been deposited.

In FIG. 5, another close-up of a grating layer stripe (501) is shown with curved focusing diffractive elements (505) etched into its top surface. The focusing diffractive elements diffract incident light (509) into a converging output signal (513). The spot size of the light diffracted from a single diffractive element will be determined by the lateral extent of the diffractive element active to scatter incident signal according to diffractive spreading principles known in the art. The distribution of diffractive elements along the length of the grating layer stripe will also play a role in determining the overall distribution of diffracted output light as a function of wavelength, position, and angle. It is known that a channel waveguide grating whose grating period is chirped (have a variation is spacing along the length of the diffractive element set) can diffract signal fields within the channel to a focused spot outside of the channel and that the angular direction to the spot changes with signal wavelength. In the present invention, the ability of individual diffractive elements to individually control output direction provides a means of eliminating diffraction of wavelengths outside bands of interest so that they may propagate without loss and interact with a subsequent integrated holographic structure or pass out of the device.

While FIGS. 4 and 5 show diffractive elements localized to the grating layer stripe, such localization is not necessary. The diffractive elements may extend beyond the grating stripe into the region wherein the guiding layer consists only of the core layer. Such extension will be useful as long as incoming bound signal modes extend out to the vicinity of the extended diffractive elements. Diffractive elements may generally be position to span all or any part of the modes bound to the grating strip. Diffractive elements may be written only in the core-only region, only in the grating stripe+core region, or in both or any part of both. Also diffractive elements may be scribed at any available layer interface or may be formed in photo-active core or grating stripe material through suitable photo-exposure. Any of the lithographic approaches to scribing including but not limited to material removal, deposition, or refractive index change may be employed to form diffractive elements.

Figure 6:
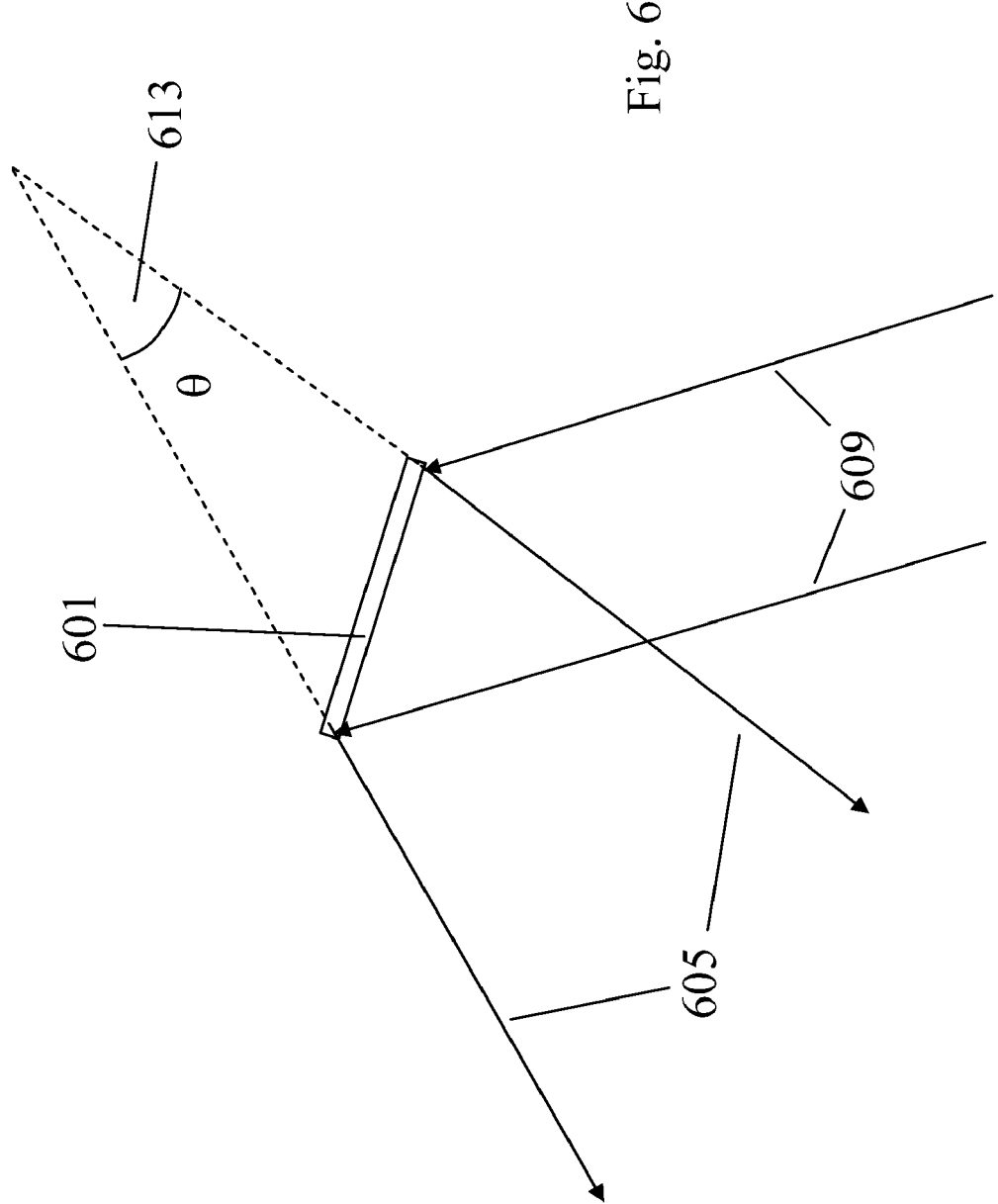
FIG. 6 illustrates schematically diffraction of an optical signal from a single exemplary diffractive element.

In FIG. 6, diffractive spreading from a diffractive element of finite extent is shown. Collimated beam, 609, is incident on the diffractive element 601. On reflection from the diffractive element, the output optical beam, 605, diverges at a characteristic angle θ shown at 613. In FIG. 6, the diffractive element 601 is flat, but a similar diffractive spreading occurs regardless of the diffractive element profile. The wider the diffractive element is the narrower the diffractive spreading. The ability to utilize diffractive elements ranging from wavelength scale to many even hundreds of wavelengths long allows for useful control over the angular range over which a single diffractive element and therefore the composite integrated holographic structure will diffract light.

Figure 7:
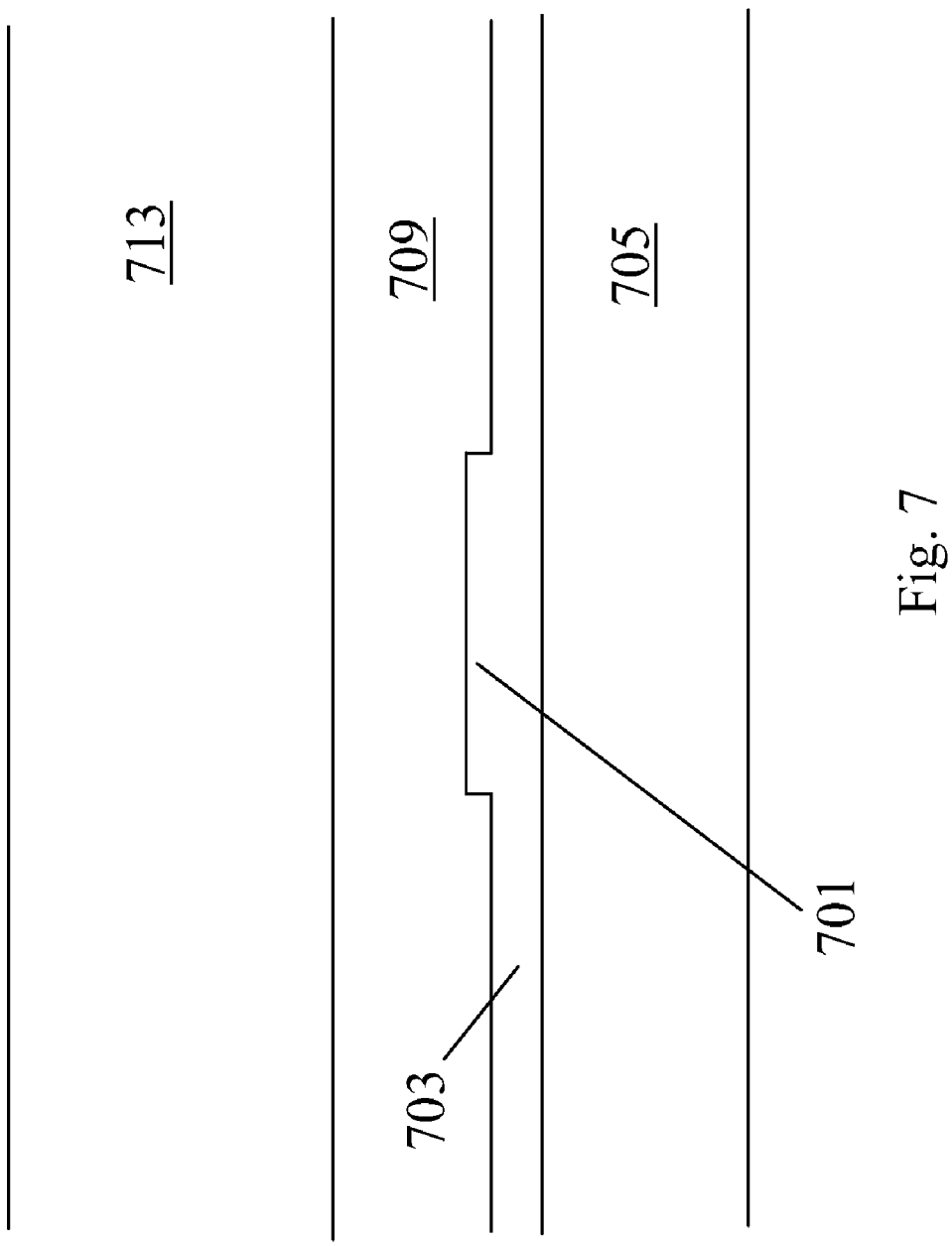
FIG. 7 illustrates schematically a cross-sectional view of another exemplary optical waveguide supporting both slab and channel waveguide optical modes.

Previously it was pointed out that the grating layer could comprise a distinct stripe of material as in FIG. 2. It is also possible, as shown in FIG. 7, for the grating layer stripe to be a rib-type feature, 701, of a higher refractive index layer, 703, which spans an extended region. The grating layer stripe may generally be any material structure both supportive of diffractive elements and active to create bound optical modes that propagate along it. Typically, there will also be a core layer, 709, and cladding layers 705, 713. The core and cladding layers serve to guide signals diffracted from the grating stripe. It should be noted that the various layers and features described in the context of the present invention may be fabricated by lithographic means including deposition and/or etch or by a variety of other means including soft lithography, stamping, nanoimprinting, embossing, injection molding, spin coating, etc. It should be noted that either or both of the cladding layers may air or vacuum. The present invention may also be implemented in waveguides comprising cladding layers and a single core layer wherein the grating layer stripe is simply a rib in the core layer and diffracted signals travel bound within the single core.

Figure 8:
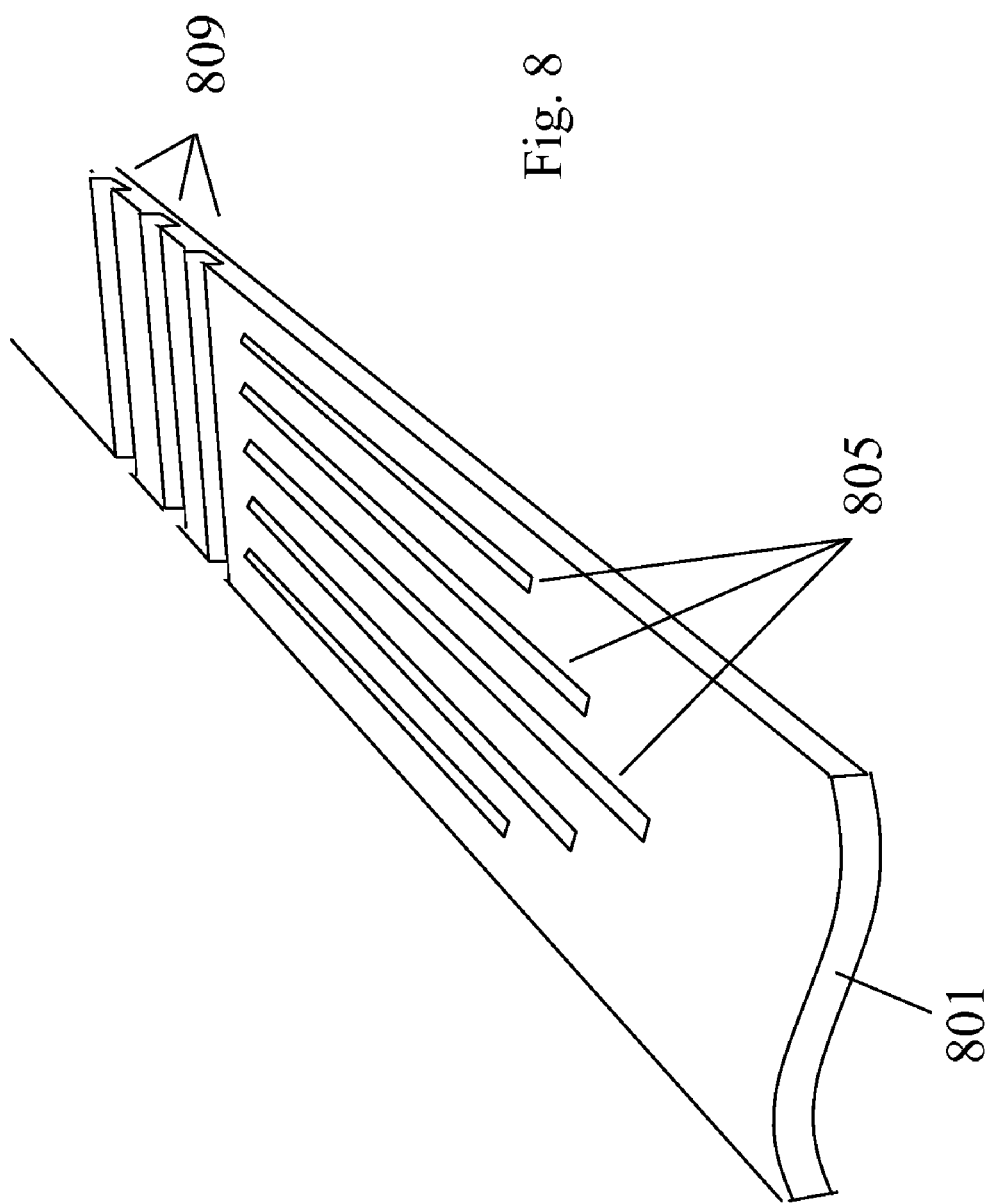
FIG. 8 illustrates schematically diffractive elements and an adiabatic coupling structure in an exemplary channel waveguide core.

As signals propagate along a grating layer stripe, they may encounter boundaries between regions with diffractive elements and regions without. The presence of diffractive elements may result in a significant change in the average refractive index of the stripe. If such an index change occurs abruptly, loss from the bound mode of interest may occur. To reduce such loss, small structures may be added to the stripe prior to the diffractive element region so that the average index change occurs slowly and bound modes evolve primarily adiabatically. In FIG. 8, one such arrangement of structures for gradual index variation is shown. In this exemplary implementation, trenches, 805, in the stripe, 801, are created. Just before the diffractive elements, 809, the transitional trenches, 805, are designed to have a duty cycle comparable to that of the diffractive elements. In other words, averaged over lengths comparable to the mode geometries or smaller, the amount of material removed in the diffractive element region and just prior in the transitional trenches is similar. As one moves farther away from the diffractive elements, the amount of material removed in the transitional trenches diminishes ultimately to zero. The arrangement and geometry of transitional structures may be generally configured with a preferred embodiment being constrained to have a slowly varying average index when averaged over mode scale sizes. The transitional trenches may be replaced with dots, preferably sub-wavelength in dimension or other small discrete marks. In the exemplary case of FIG. 8, the diffractive elements and transitional trenches would be filled with material from the core layer.

Figure 9:
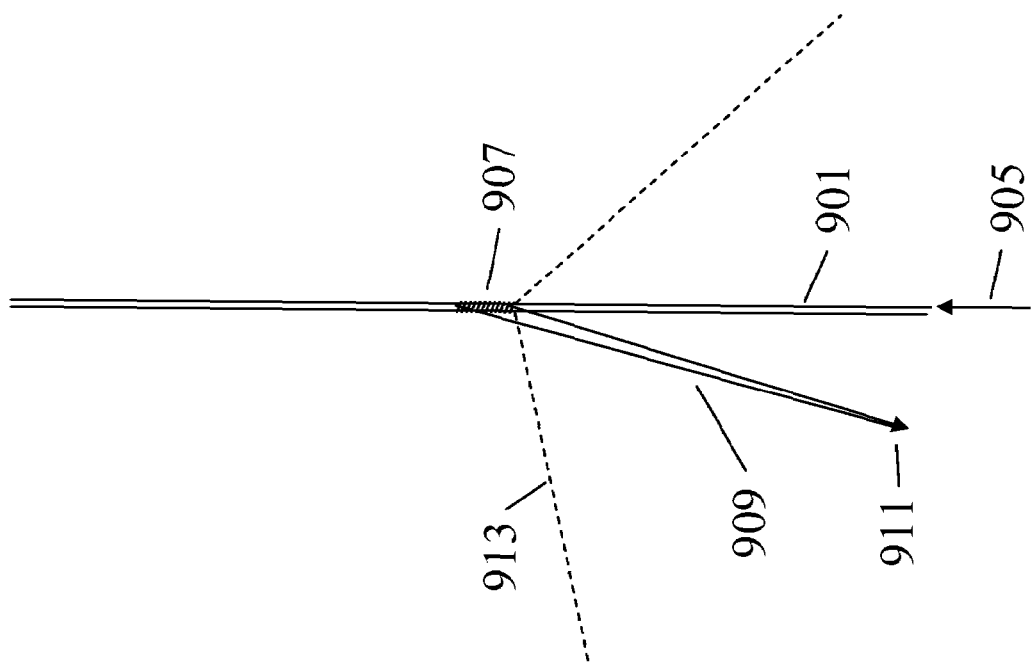
FIG. 9 illustrates schematically an exemplary prior art waveguide having a diffractive element set spatially chirped for focusing a diffracted optical signal.

FIG. 9 portrays a schematic of prior art focusing of light diffracted by diffractive elements, 907, within a channel waveguide 901. The focusing is introduced by a chirp in the spatial periodicity of the diffractive elements along the guide. Light scattered by each individual diffractive element emerges over a wide angular area, 913. Light of a specific wavelength follows trajectories 909 and is focused to a small spot at 911. Light of different wavelengths would emerge along different directions to focus at other spots. Because of the wide angular width addressed by each individual diffractive element, light over a large range of wavelengths is diffracted by the grating. It follows that the grating produces loss relative to transmission for a wide range of wavelengths. The channel waveguide grating of FIG. 9 provides useful function as a spectrometer where wide ranges of wavelengths must be diffracted. Because of the loss it introduces over wide wavelength ranges, however, it is less useful in cases where transmitted signals are used.

In FIGS. 10A and 10B, filters implemented according to the present invention are shown. In FIG. 10A, light, 1009, is propagating toward the top of the figure along grating layer stripe 1001. It encounters an integrated holographic filter, 1005, comprised of a plurality of diffractive elements. Each individual diffractive element diffracts light along a narrow cone, 1021, to propagate external to the grating stripe. The spectrum of light scattered along this narrow cone can be programmed by adjusting the spacing and amplitude of the diffractive elements comprising the integrated holographic structure as is the case for fully two-dimensional holographic spectral filters as described in the references incorporated herein. The collective action of many diffractive elements can also be employed to focus, 1017, light of a particular wavelength to a small spot, 1013, within the cone diffracted by single diffractive elements, 1021. Light of different wavelengths is focused to different spots when chirp focusing is employed. This property of chirp focusing is similar to that employed in channel waveguides known to the prior art. Chirp focusing need not be employed in the present device, but can be if resultant angular dispersion does not adversely affect coupling of desired spectral passbands to output ports. When broad flat passbands are to be coupled to single mode outputs, difficulties in achieving high efficiency output coupling for all passband wavelengths can occur when angular dispersion is employed by the filtering mechanism. If, for a certain wavelength, the spot that the set of diffractive elements would create via chirp focusing falls outside of the cone of light diffracted by a single diffractive element then that wavelength is not strongly diffracted. In overview, the diffractive element set 1005 performs multiple functions. The transverse extent of the diffractive elements localizes the angular range over which each element diffracts light. A spatial chirp of the diffractive element spacing can contribute to focusing of a specific wavelength of the output signal to a specific output spot. An additional phase and amplitude apodization of the diffractive element set provides for a tailoring of the passband as for holographic spectral filters described in the incorporated references. More generally, the output spot may rather be an output direction. In this and other figures, the described devices are bidirectional so that the input and the output propagation directions may be reversed.

In FIG. 10B, a grating layer stripe, 1031, is shown containing three different integrated holographic structures, 1035, each containing a plurality of diffractive elements. Each integrated holographic structure directs light within a certain design passband to design output ports. As shown the output signals, 1039, are focused to spots, 1047. The outputs may alternatively be directed to design directions with chosen wavefronts. The output signals may be directed to a channel waveguide, 1051, which is a one-dimensional guiding material surrounded by cladding, 1055. Such a waveguide may be employed to bring signals to or from the edge of a die, 1059. The first integrated holographic structure may be designed to select a certain bandwidth from input signal 1043 and route it to an output port. Signals outside the design bandwidth of the first filter are passed to the second integrated holographic filter structure where another passband is removed and directed to an output. Similarly for the third and subsequent integrated holographic filters. Signals transmitted through all filter structures may be collected at the end of the grating stripe as described below. It is often useful to place the shortest wavelength passband filter first with others ordered from short to long wavelength. It may also useful to have relatively high index contrast between core and cladding layers to reduce scattering of wavelengths blue shifted relative to the filter resonance wavelength(s) out of the slab waveguide. Spatial Fourier components of the filters can scatter in-plane signals to unbound or cladding bound modes when the signal wavelength is blue shifted relative to the filter resonance wavelength, but there is a wavelength gap which scales with index contrast before out-of-plane scattering can occur.

In designing devices after the present invention, care should be given to including the Snell's law refraction effects that occur as signals transition through the edges of the grating layer stripe.

FIG. 10C shows a drop filter where the signal diffracted out of one grating layer stripe, 1061, by diffractive element set, 1065, is received by a second grating layer stripe, 1067. A narrow gap is left between the two stripes so that signals passing through grating layer stripe 1061 are minimally perturbed by the presence of the second grating layer stripe 1067. The edge of the second grating layer stripe in immediate proximity to the first grating layer stripe, 1061, may be corrugated or otherwise structured so as to present a gradual variation in refractive index if required to minimize mode mismatch at the boundary. The diffractive elements are optimized to diffract a wavefront optimally coupled to the desired bound mode of the second grating layer stripe. The second stripe may be of a different thickness and width compared to the first grating layer stripe and may also be coupled to channel waveguides as described below.

Figure 11:
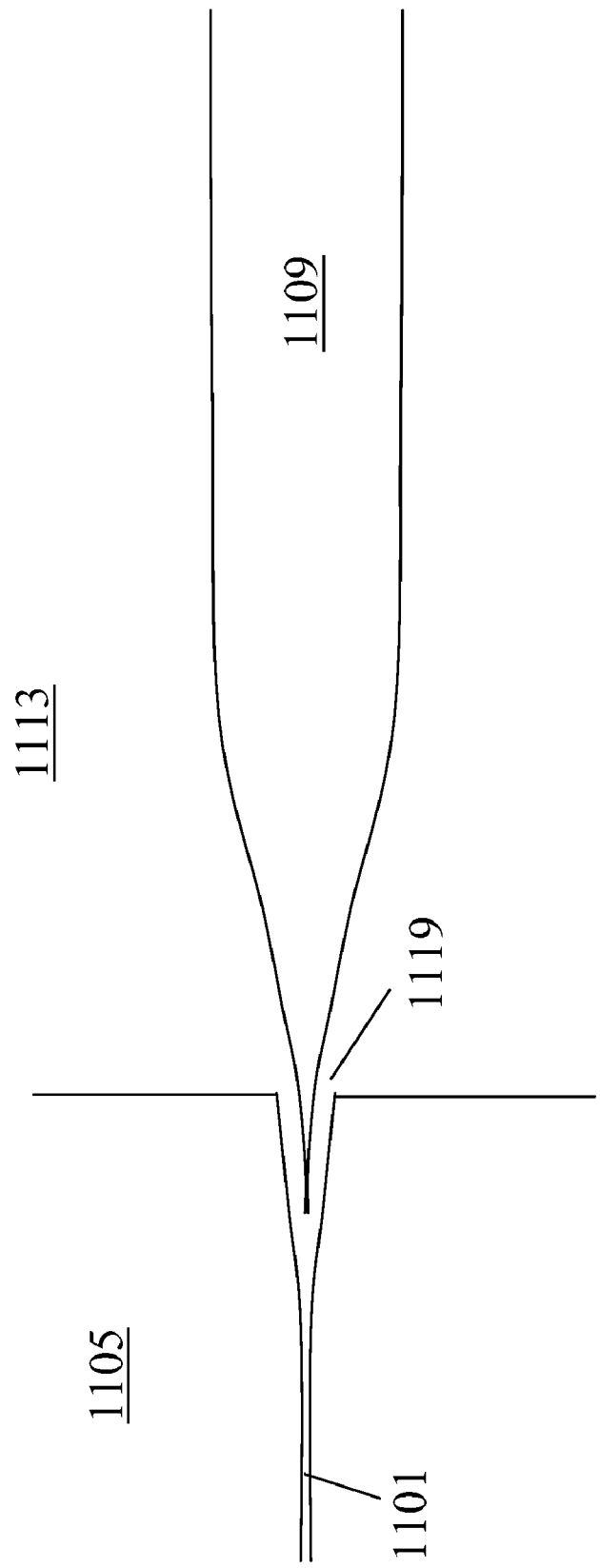
FIG. 11 illustrates schematically an exemplary arrangement for substantially adiabatic coupling between channel waveguides.

FIG. 11 shows an exemplary arrangement for coupling a grating layer stripe to standard channel waveguides. In this example, channel waveguide 1101 comprises a guiding channel surrounded entirely by cladding, 1105. The precise design of the channel waveguide is not limiting to the coupling concept. The single core design highlighted here is perhaps the most commonly employed channel waveguide. The channel waveguide may be employed to carry signals from the edge of a die where they may be coupled to an off-chip fiber or for any other signal transport purpose. In order to couple the signal within the channel waveguide to a grating layer stripe located within a fully two-dimensional slab waveguide with minimal loss, it is necessary to create a guiding structure allowing for the adiabatic evolution of the signal mode from its form within the channel waveguide to its appropriate form for propagation along the grating layer stripe. The arrangement of FIG. 11 allows for this. The channel waveguide is tapered in the plane of the figure to increasing width. The grating layer stripe is configured to taper to a sharp point, 1119, in the central region of the expanding channel waveguide core. The grating layer stripe is provided to become thicker and thicker at a rate that provides a slow variation in the local modal structure. Eventually, the channel waveguide core transitions to the full slab waveguide geometry 1113 and the grating layer stripe stabilizes in width at its design maximum in region 1109. This geometry provides a very low loss coupling between channel waveguide signals and grating layer stripe signals. The coupling may be used bi-directionally, i.e., signals traveling along the grating layer stripe may be coupled with low loss into the channel waveguide. The detailed geometry of the channel waveguide and grating stripe tapers may be determined with beam propagation and waveguide mode analysis methods known in the art under the constraint of adiabatically transitioning the channel waveguide mode to the grating layer stripe mode (or vice versa). Specifically, it is not necessary to taper the grating layer stripe to a single sharp point.

Figure 12:
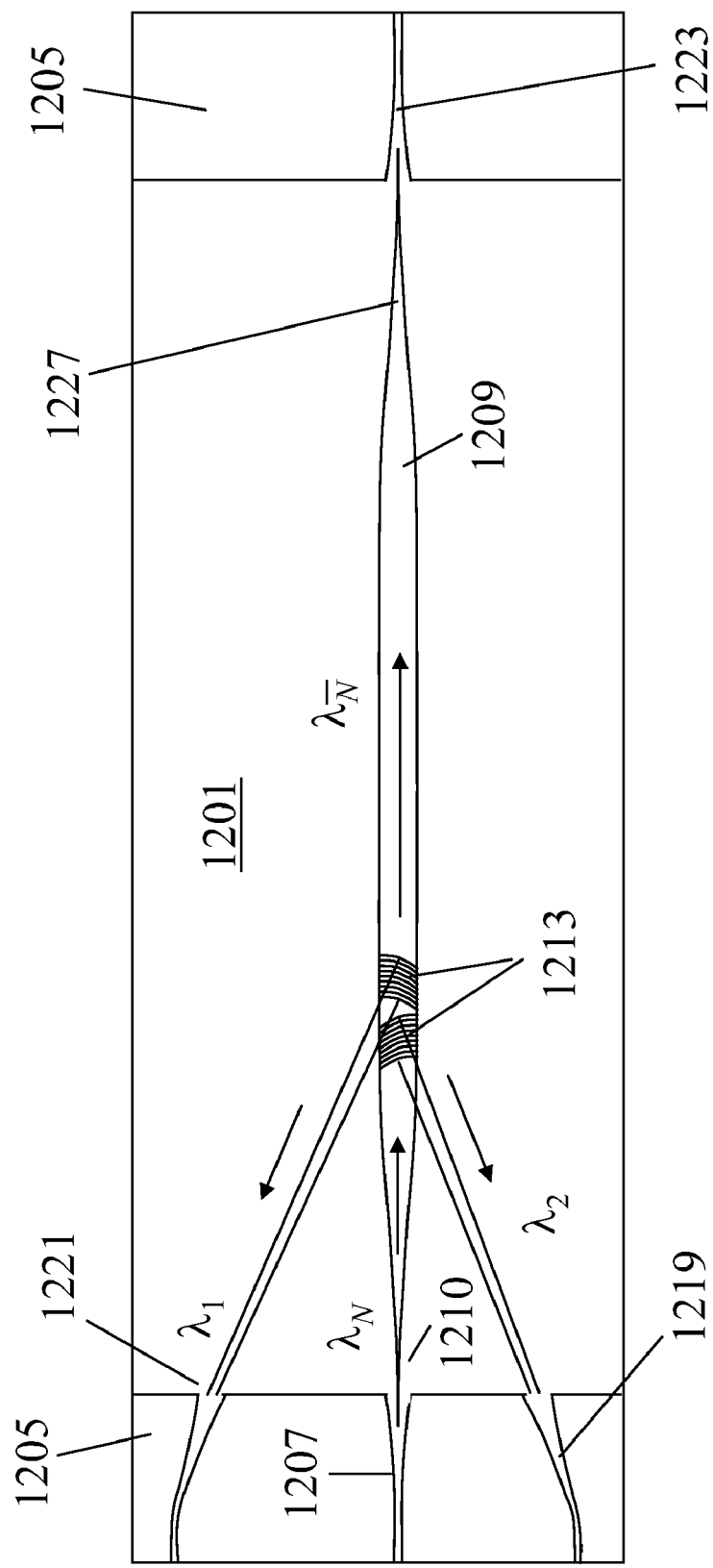
FIG. 12 illustrates schematically an exemplary wavelength add/drop filter.

A wavelength add/drop filter is shown in FIG. 12. An optical signal containing a number of wavelengths, $\lambda_N$, is incident through channel waveguide 1207. The channel waveguide may couple to a fiber at the edge of the die or it may simply convey signal from other locations on the die. Channel waveguide 1207 comprises a guiding core surrounded by cladding 1205. The signal propagates through a coupling region, 1210, onto the grating layer stripe, 1209. Two integrated holographic structures, 1213, each comprised of a plurality of diffractive elements are active to diffract light of different wavelengths to output ports. A wavelength band in the vicinity of $\lambda_1$ is routed to port 1221, while a wavelength band in the vicinity of $\lambda_2$ is routed to port 1219. After passing through the integrated holographic structures, an optical signal containing wavelengths $\lambda_{\overline{N}}$ (input minus passbands deflected by filters 1213) continues to propagate along the grating layer stripe, enters a channel waveguide with low loss via a tapered coupler 1227, and continues through a channel waveguide 1223 to exit at the die edge or to reach another location on the die. As described in the references incorporated into this document, the spacing and effective diffractive amplitude within the integrated holographic structures defines the spectral passband function. The individual diffractive elements within the integrated holographic structures are typically curved so as to modify the wavefronts of signals interacting with them. However, straight diffractive elements may be used when advantageous. The focusing of signals into the output port can be modified by controlled variation of the spacing (typically but not only via linear chirp) between constitutive diffractive elements.

Figure 13:
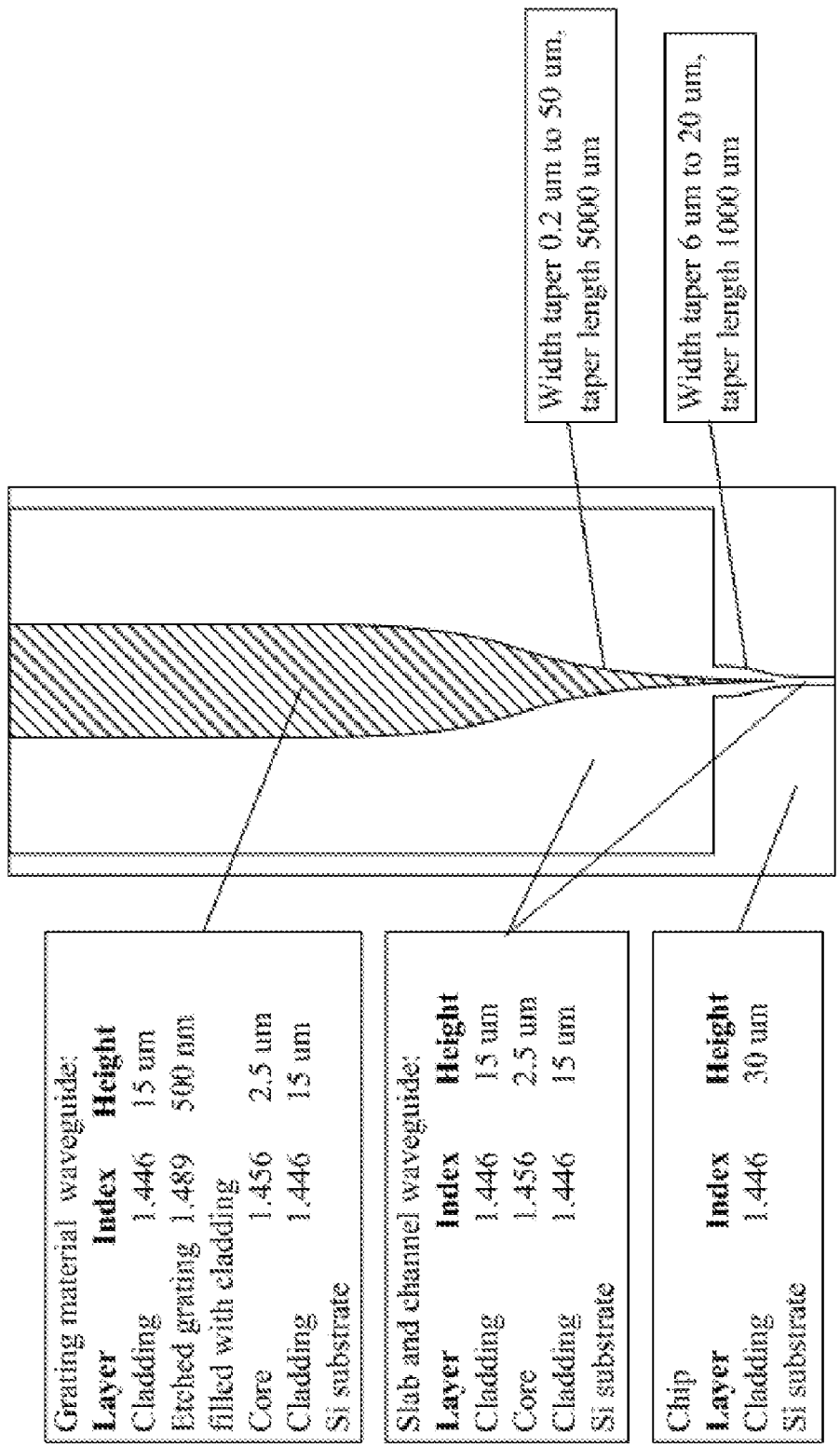
FIG. 13 illustrates schematically an exemplary arrangement for substantially adiabatic coupling between channel waveguides.

More details describing an exemplary tapered coupling between channel and grating layer stripe mode guiding structures are shown in FIG. 13. The details are for illustration only and many variations of the coupling geometry and refractive indices are possible and can be optimized using tools well known in the art.

It should be noted that the various methods of amplitude and phase control for diffractive elements including but not limited to partial scribing, partial fill, correlated line set, and control of diffractive element placement described in the incorporated references may be employed to control the passbands of integrated holographic filtering structures fabricated within the grating layer stripes described here.

It should also be emphasized that present laterally confined holographic spectral filter invention may be employed in multiple material formats including silicon, silica-on-silicon, polymer, air, and any other layer materials and layer architectures active to guide signals on a stripe while also guiding them in two-dimensions in directions suitably angled relative to the stripe.

Figure 14:
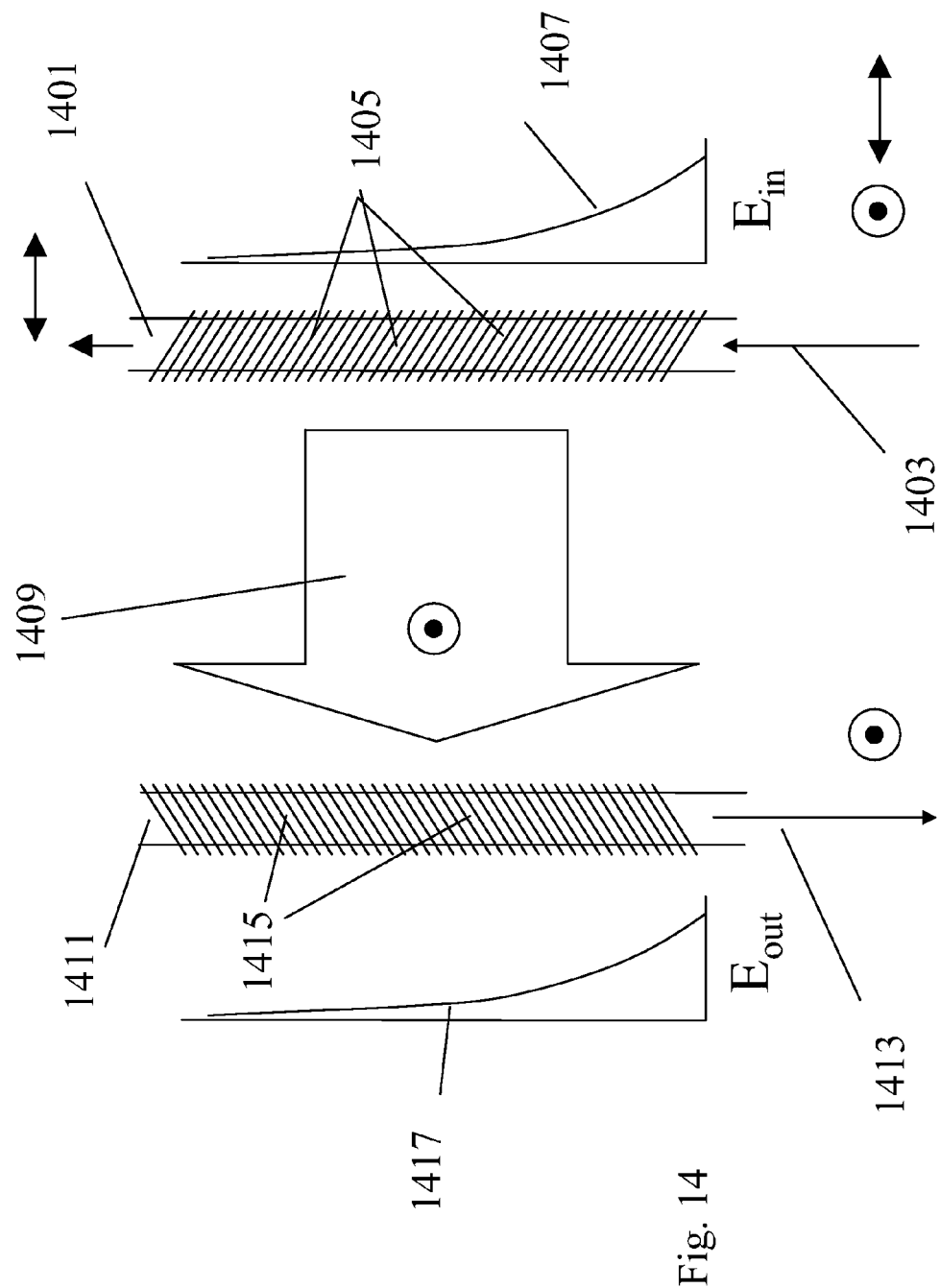
FIG. 14 illustrates schematically an exemplary waveguide polarizer.

Guiding structures as described here comprising a slab waveguide with core layer and stripes of grating guiding material can be employed as integrated polarizers. As shown in FIG. 14, two grating guiding stripes, 1401 and 1411, are located adjacently. The stripes are laterally displaced sufficiently so that absent diffractive elements, 1405 and 1415, signals propagating within one of the grating guiding stripes is not coupled into the other stripe in an amount sufficient to create unacceptable cross talk between signals. In this exemplary polarizer embodiment, signal light 1403 which may contain both allowed states of polarization (in a linear basis in this instance) propagates along grating guiding stripe 1401. The entry point shown may simply be the continuation of a grating guiding stripe or an input port of some kind to the waveguide region. Any input port providing for the coupling of input light to the grating guided mode is acceptable. Signal propagating in the input grating guided waveguide encounters diffractive elements 1405 oriented so as to diffract only one of the linear polarizations allowed to propagate in the waveguide. A common arrangement to achieve coupling with only one linear polarization component is to orient the diffractive elements 1405 at Brewster's angle for one of the polarizations. As shown in FIG. 14, the diffractive elements are simple straight segments arranged at Brewster's angle relative to the polarization component parallel to the plane of the slab waveguide (and to the plane of the Figure). Such an in-plane-polarized signal propagates past the diffractive elements. After the diffractive element region, the in-plane-polarized signal will be pure to the extent that the diffractive elements act to out-couple (i.e., diffract) the entire polarization component perpendicular to the plane of the slab waveguide (and the Figure; i.e., the out-of-plane-polarized component). While, in principle, some finite out-of-plane-polarized signal power will always remain, increasing the length of the diffractive element region 1405 or increasing the coupling of individual diffractive elements to the out-of-plane-polarized signal component allows essentially any desired level of overall out-coupling of the out-of-plane polarization. Spacing of the diffractive elements is set to provide interaction with the signal wavelength or range of wavelengths of interest.

The out-coupled out-of-plane-polarized component 1409 propagates away from the first grating guiding region (still confined in the dimension perpendicular to the Figure by the slab waveguide). Its propagation direction relative to the first grating guiding structure 1405 will be set by the Brewster angle condition applied to the diffractive elements in the first grating-guiding structure 1405. In FIG. 14, the out-coupled out-of-plane-polarized signal component 1409 is shown propagating nearly normal to the first grating guiding stripe 1401 as would typically be the case in the absence of large refractive index differences between the various structures. The signal 1409 is coupled by diffractive elements 1415 to propagate along grating guiding stripe 1411 as signal 1413.

In the simplest case, the diffractive elements 1415 of the grating guiding region of the second grating guiding stripe 1411 may be oriented also at Brewster's angle relative to the grating guided in-plane polarization. Angular orientation of the second grating guiding stripe 1411 relative to the first grating guiding stripe 1401 may then be determined by the Brewster condition. It is not necessary that the orientation of the second grating-guiding stripe 1411 and its diffractive elements 1415 be constrained by Brewster's angle considerations as only pure out-of-plane-polarized light impinges on them. It is not necessary that the two grating guiding stripes 1401 and 1411 be parallel.

Graphs 1407 and 1417 illustrate schematically the spatial evolution of the field amplitude of the out-of-plane-polarized optical signal during propagation along grating guiding stripes 1401 and 1411, respectively (roughly exponential growth or decay, assuming relatively weak reflectivity of individual diffractive elements 1405 and 1415). Relatively greater coupling efficiency of signal 1409 into grating guiding stripe 1415 is achieved in the illustrated counter-propagating arrangement. A co-propagating arrangement can also be used, which typically would exhibit relatively lower coupling efficiency of optical signal 1409 into grating guiding stripe 1411.

It is intended that equivalents of the disclosed exemplary embodiments and methods shall fall within the scope of the present disclosure and/or appended claims. It is intended that the disclosed exemplary embodiments and methods, and equivalents thereof, may be modified while remaining within the scope of the present disclosure or appended claims.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" or "a dog or a cat or a mouse" would be interpreted as "a dog, or a cat, or a mouse, or any two, or all three"), unless: (i) it is explicitly stated otherwise, e.g., by use of "either . . . or", "only one of . . . ", or similar language; or (ii) two or more of the listed alternatives are mutually exclusive within the particular context, in which case "or" would encompass only those combinations involving non-mutually-exclusive alternatives. For purposes of the present disclosure or appended claims, the words "comprising", "including", "having", and variants thereof shall be construed as open ended terminology, with the same meaning as if the phrase "at least" were appended after each instance thereof.

What is claimed is:

1. An optical apparatus, comprising:
a first cladding layer;
a second cladding layer;
a first guiding layer between the first and second cladding layers, and having a core sublayer; and
a second guiding layer between the first and second cladding layers, and having a grating stripe that includes a set of diffractive elements, wherein the grating stripe has a higher refractive index relative to the core sublayer and wherein the grating stripe is configured to establish discretized signal modes that propagate along an extended direction of the grating stripe and to bound the signal modes transversely,
wherein:
the first and second cladding layers and the first guiding layer are arranged so as to form a slab waveguide that supports a plurality of slab waveguide optical modes and that substantially confines in one transverse dimension optical signals propagating in two dimensions in the slab waveguide optical modes;
the first and second cladding layers and the second guiding layer are arranged so as to form a channel waveguide that supports one or more channel waveguide optical modes and that substantially confines in two transverse dimensions optical signals propagating in one dimension in the channel waveguide optical modes; and
the diffractive elements are arranged so as to couple at least one of the slab waveguide optical modes and at least one of the channel waveguide optical modes so as to enable transfer of a first optical signal from the at least one slab waveguide optical modes to the at least one channel waveguide optical modes thus coupled and transfer of a second optical signal from the at least one channel waveguide optical modes to the at least one slab waveguide optical modes thus coupled.

2. The apparatus of claim 1 wherein the diffractive elements form a holographic structure.

3. The apparatus of claim 1 wherein the diffractive elements are arranged to diffract light of different wavelengths to respective different output ports, including being arranged to diffract light having a particular at least one wavelength in said extended direction of the grating stripe towards an output location.

4. An optical apparatus, comprising:
a slab waveguide to support a plurality of slab waveguide optical modes and to substantially confine in one transverse dimension optical signals propagating in two dimensions in the slab waveguide optical modes;
a channel waveguide to support one or more channel waveguide optical modes and to substantially confine in two transverse dimensions optical signals propagating in one dimension in the channel waveguide optical modes; and diffractive elements arranged in the slab waveguide to couple at least one of the slab waveguide optical modes and at least one of the channel waveguide optical modes so as to enable transfer of a first optical signal from the at least one slab waveguide optical modes to the at least one channel waveguide optical modes thus coupled, wherein the slab waveguide includes:
first and second cladding layers;
a first guiding layer between first and second cladding layers, and having a core sublayer; and
a second guiding layer between the first and second cladding layers, and having a grating stripe that includes said diffractive elements, wherein the grating stripe has a higher refractive index relative to the core sublayer and wherein the grating stripe is configured to discretize said slab waveguide optical modes, which propagate along an extended direction of the grating stripe, and configured to bound the slab waveguide optical modes transversely.

5. The apparatus of claim 4 wherein the diffractive elements are arranged to also enable transfer of a second optical signal from the at least one channel waveguide optical modes to the at least one slab waveguide optical modes thus coupled.

6. The apparatus of claim 4 wherein the diffractive elements are arranged to diffract light of different wavelengths to respective different output ports, including being arranged to diffract light having a particular at least one wavelength in said extended direction of the grating stripe towards an output location.

7. The apparatus of claim 4 wherein the grating stripe has an increasing taper, the channel waveguide having a guiding channel of increasing width in a direction towards the slab waveguide to correspondingly receive a portion of the grating stripe having an increasing taper.

8. The apparatus of claim 7 wherein the grating stripe has first and second ends each including a respective said portion having the increasing taper, and wherein a respective one of said channel waveguide having the guiding channel of increasing width is positioned at respective said first and second ends of the grating stripe to receive the portion of the grating stripe.

9. The apparatus of claim 4 wherein the diffractive elements form a holographic structure.

10. The apparatus of claim 4 wherein the diffractive elements are arranged on first and second ones of said grating stripe of the slab waveguide, the first and second stripes being proximately located to each other to form a polarizer, the diffractive elements of the first grating stripe being adapted to produce polarized light from a light incident thereon, the diffractive elements of the second grating stripe being adapted to receive the polarized light produced by the diffractive elements of the first grating stripe and adapted to couple the received polarized light to propagate along the second grating stripe.

11. A method, comprising:
receiving, in a slab waveguide that supports a plurality of slab waveguide optical modes and that substantially confines in one transverse dimension optical signals propagating in two dimensions in the slab waveguide optical modes, a first optical signal;
receiving, in a channel waveguide that supports one or more channel waveguide optical modes and that substantially confines in two transverse dimensions optical signals propagating in one dimension in the channel waveguide optical modes, a second optical signal; and
coupling, by diffraction by diffractive elements, at least one of the slab waveguide optical modes and at least one of the channel waveguide optical modes so as to enable transfer of the first optical signal from the at least one slab waveguide optical modes to the at least one channel waveguide optical modes thus coupled and transfer of the second optical signal from the at least one channel waveguide optical modes to the at least one slab waveguide optical modes thus coupled, wherein the slab waveguide includes:
first and second cladding layers;
a first guiding layer between first and second cladding layers, and having a core sublayer; and
a second guiding layer between the first and second cladding layers, and having a grating stripe that includes said diffractive elements, wherein the grating stripe has a higher refractive index relative to the core sublayer and wherein the grating stripe discretized said slab waveguide optical modes, which propagate along an extended direction of the grating stripe, and bounds the slab waveguide optical modes transversely.

12. The method of claim 11 wherein said coupling by diffraction includes diffracting light of different wavelengths to respective different output ports, including diffracting light having a particular at least one wavelength in said extended direction of the grating stripe towards an output location.

13. The method of claim 11 wherein said coupling by diffraction includes diffracting using a tapered shape of said diffractive elements located in the slab waveguide.

14. The method of claim 11 wherein the diffractive elements are arranged on first and second ones of said grating stripe of the slab waveguide, the method further comprising arranging the first and second stripes as a polarizer, said arranging as the polarizer including:
producing polarized light by the diffractive elements of the first grating stripe from a light incident thereon;
receiving, by the diffractive elements of the second grating stripe, the polarized light produced by the diffractive elements of the first grating stripe; and
coupling, by the diffractive elements of the second grating stripe, the received polarized light to propagate along the second grating stripe.

15. The method of claim 11 wherein said coupling by diffraction includes diffracting using a holographic structure.

16. An apparatus, comprising:
slab waveguide means for receiving a first optical signal, the first slab waveguide means supporting a plurality of slab waveguide optical modes and substantially confining in one transverse dimension optical signals propagating in two dimensions in the slab waveguide optical modes;
channel waveguide means for supporting one or more channel waveguide optical modes and for substantially confining in two transverse dimensions optical signals propagating in one dimension in the channel waveguide optical modes; and
diffraction means for coupling at least one of the slab waveguide optical modes and at least one of the channel waveguide optical modes so as to enable transfer of the first optical signal from the at least one slab waveguide optical modes to the at least one channel waveguide optical modes thus coupled, wherein the slab waveguide means includes:
first and second cladding layers;

a first guiding layer between first and second cladding layers, and having a core sublayer; and a second guiding layer between the first and second cladding layers, and having a grating stripe that includes said diffraction means, wherein the grating stripe has a higher refractive index relative to the core sublayer and wherein the grating stripe is configured to discretize said slab waveguide optical modes, which propagate along an extended direction of the grating stripe, and configured to bound the slab waveguide optical modes transversely.

17. The apparatus of claim 16 wherein the diffraction means for coupling also enable transfer of a second optical signal from the at least one channel waveguide optical modes to the at least one slab waveguide optical modes thus coupled.

18. The apparatus of claim 16 wherein the diffraction means include diffractive elements are arranged on first and second ones of said grating stripe of the slab waveguide means, the first and second stripes being arranged as a polarizer so as to:

produce polarized light by the diffractive elements of the first grating stripe from a light incident thereon;

receive, by the diffractive elements of the second grating stripe, the polarized light produced by the diffractive elements of the first grating stripe; and couple, by the diffractive elements of the second grating stripe, the received polarized light to propagate along the second grating stripe.

19. The apparatus of claim 16 wherein the diffraction means are arranged in a tapered shape of said grating stripe of said second guiding layer of the slab waveguide means.

20. The apparatus of claim 16 wherein the diffraction means form a holographic structure.

* * * * *

UNITED STATES PATENT AND TRADEMARK OFFICE
CERTIFICATE OF CORRECTION

PATENT NO. : 7,720,334 B1
APPLICATION NO. : 11/774567
DATED : May 18, 2010
INVENTOR(S) : Thomas W. Mossberg et al.

It is certified that error appears in the above-identified patent and that said Letters Patent is hereby corrected as shown below:

Column 15, line 17, "elements are arranged" should read --elements arranged--.

Signed and Sealed this

Twenty-first Day of September, 2010

David J. Kappos
*Director of the United States Patent and Trademark Office*